United States Patent Office 2,984,865
Patented May 23, 1961

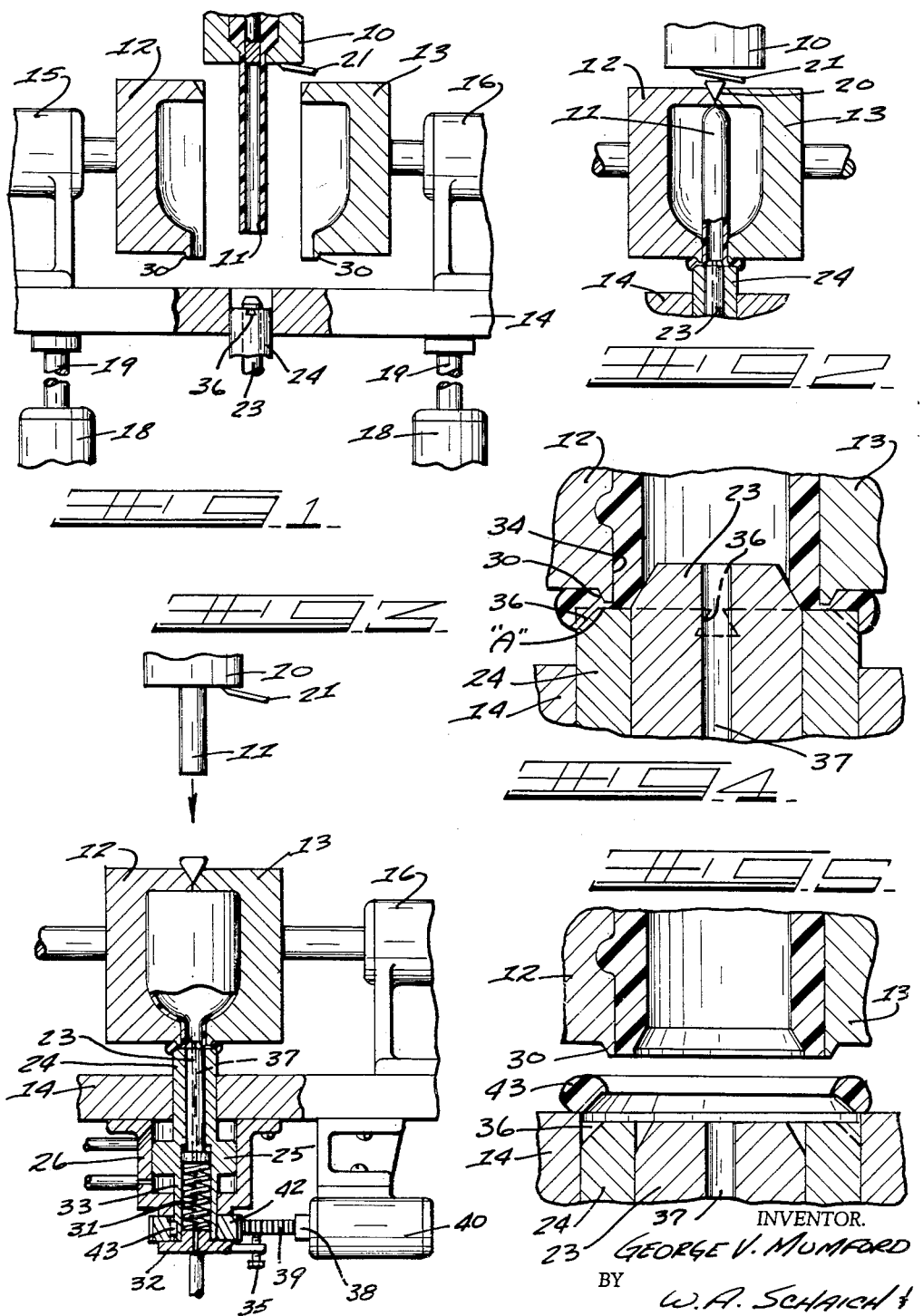

2,984,865
METHOD AND APPARATUS FOR TRIMMING PLASTIC ARTICLES

George V. Mumford, Toledo, Ohio, assignor to Owens-Illinois Glass Company, a corporation of Ohio Filed Aug. 29, 1958, Ser. No. 758,157

4 Claims. (Cl. 18—5)

My invention relates to the making of plastic articles of the type fabricated from heated extruded organic plastic tubing and in particular to the blown articles made by expanding such heated plastic tubing within the confines of a shaping mold. In some of the known similar processes for making hollow articles the process, per se, makes it inherently necessary to trim one or both ends of the blown article after it is removed from the final blowing mold.

This present invention is direct to such processes and has for its primary object the elimination of the need for trimming at least one end of the blown article.

A further object is to trim this article at or during its formation and while in the mold.

Other objects will be apparent from the following description matter and the drawings.

In the drawings:

Fig. 1 is a sectional elevation illustrating the extrusion of a length of tubing between the halves of a blowing mold, Fig. 2 is a sectional elevation illustrating the completion of the extrusion and the enclosing thereof within the blowing mold, Fig. 3 is a further elevational view illustrating the blown article and the actuating mechanism for trimming the articles, Fig. 4 is an enlarged sectional view illustrating the relationship of the trimming mechanism and the mold, and, Fig. 5 is a further enlarged view illustrating the completion of the trimming and the stripping of the trimmed portion from the mechanism.

Referring to the drawings, drawing 10 is an extrusion nozzle of the usual or well-known type in which a pressure screw performs operation of the plasticizing of the organic plastic material by application of heat and pressure and which continuously extrudes the heated plasticized material in hollow tubular form 11.

As shown in Fig. 1, the heated tubing is being extruded downwardly, the mold halves 12 and 13 have been raised with the table 14 to the position where they may be closed by the cylinders 15 and 16. The mechanism for raising and lowering the table 14 may be a pair of cylinders 18 and pistons 19 respectively connected to opposite sides of the table 14. When a sufficient length of tubing 11 has been extruded a timing device (not shown) will actuate the cylinders 15 and 16 to close the mold halves 12 and 13 about the tube 11, (Fig. 2) pinching and sealing same as at 20. Simultaneously with this mold closing a knife 21 severs the extruding tube without blocking the continued extrusion thereof and the molds 12 and 13 start their downward movement with the severed length of tube therein. Concurrent with this mold closing a mandrel 23 and piston rod 24 are moved upwardly by the piston 25 of the cylinder 26 mounted on and movable with table 14.

The mandrel 23 and piston sleeve 24 are now in the position illustrated in Figs. 2 and 3 and as shown in the enlarged view Fig. 4. The mandrel 23 has already entered into the opening of the tube 11, by preceding the rod 24, due to the spring 31 between it and the cap 32 at the lower end 33 of this piston rod 24. The entrance of mandrel 23 into tube 11 causes the material in the end of the plastic tube to be forced against the neck portion 34 of the mold halves 12 and 13 and held there by the pressure from spring 31. Air under pressure is then admitted through opening 37 in mandrel 23 to expand the tube 11 into a hollow article as shown in Fig. 3, the tube 11 has been expanded to final form by the time table 14 reaches its lowermost position.

The piston rod 24 continues to move up, until the stop 35 halts any further upwardly movement thereof, squeezing the material radially outward as shown in Fig. 4 and into a series of slots 36 formed in the end of piston rod 24. A circular severing edge 30 formed on the bottom of the mold halves 12 and 13 is then in contact or approximate contact with the top end of the piston sleeve 24 thus either severing the plastic at this point "A" or spreading it to such thinness as to be almost severed. The stop 35 may be adjusted to provide any desired thickness at point "A."

With the completion of the upward movement of the piston rod 24 the piston 38 of the cylinder 40 is actuated to move the rack 39 outwardly and back to thereby rotate the gear 42 which is keyed, as at 43, to the portion 33 of the piston rod 24. The plastic material which has entered the slots 36 will harden and set to some extent in these slots 36 and as the piston rod 24 is rotated by the gear 42, the plastic will separate at point "A," due to this relative rotation as between the sleeve 24 and the lip 30 of the molds leaving the neck of the article in trimmed condition.

As the shearing is completed the piston 25 of cylinder 26 is lowered causing the plastic portion 43 to contact the top surface of the table 14 (Fig. 5) and strip it from the slots 36 as in Fig. 5 to permit it to be removed by a blast of air. With the completion of the severing operation, the mold halves 12 and 13 will be opened and the blown article removed from the machine.

The general operation of the machine is as follows:

A tube formation 11 is continuously extruding from the nozzle or extruder 10 and when a sufficient length thereof has been extruded, for a particular article, the blow molds halves 12 and 13 and table 14, which have been raised to a position beneath the extruder orifice by cylinder 18 and piston 19, will be closed about the extrusion 11. The closing of the molds seals the upper end of the tube and the knife 21 severs the enclosed tube from the nozzle 10. Immediate with this closing of the molds, the mold halves 12 and 13 together with table 14 move downwardly and the mandrel 23 is injected into the open end of tube 11 while the sleeve or piston rod 24 squeezes the material as at point "A."

With the completion of the closing of the mold halves 12 and 13 and the consequent sealing of the top end of tube 11, air under pressure can be admitted through opening 37 to expand the tube into a hollow article. The cylinder 40 is then actuated to rotate the gear 42 and piston or sleeve 24 to insure that the excess of plastic material at the neck of the molds, as at "A," has been completely freed from this blown article. The mold halves 12 and 13 are opened and the blown article is discharged from the machine.

During the described preceding operations the extruder has continued to extrude a tube 11, as in Fig. 3, and immediately upon the mold halves 12 and 13 becoming empty they are again free to repeat the forming cycle outlined above.

Modifications may be resorted to within the spirit and scope of the appended claims.

I claim:

1. In an apparatus for shaping and trimming blown plastic articles the combination of a pair of blow mold halves, each of which is provided with a neck forming portion at one end thereof, an annular lip formed on each said mold half as an extension of said neck portions, said lip ending in the form of a thin edge, a mandrel arranged for aligned entrance into said neck portion, an annular sleeve member surrounding said mandrel and arranged for rotative-cooperation with said annular lip, plastic holding means formed on the end of said sleeve member and means to rotate said sleeve member.

2. In an apparatus for shaping and trimming blown plastic articles the combination of a partible blow mold provided at one end thereof with an end forming portion, an anular lip formed as an extension of said end forming portion, said lip being in the form of a knife-like edge, a mandrel arranged for aligned entrance into said end portion, an annular sleeve member surrounding said mandrel and arranged for relative axial and rotational movements with respect to said annular lip, means for axially shifting said annular sleeve member into closely proximate relationship to said knife-like edge and means to rotate said sleeve member.

3. In an apparatus for shaping and trimming blown plastic articles, the combination of a partible blow mold provided with a neck forming portion at one end thereof, the outer end of said neck forming portion defining an annular lip having its extremity formed as a knife-like edge, means for inserting a heated tubular formation of thermoplastic material in said partible blow mold with an excess portion of said formation extending beyond said annular lip, a mandrel arranged for aligned entrance through said tubular formation into said neck portion, an annular sleeve member surrounding said mandrel, means for axially shifting such sleeve member towards said annular lip thereby laterally displacing said excess plastic portion outwardly around said knife-like edge, and means to rotate said sleeve relative to said annular lip to sever said excess portion of the tubular formation at the plane of said knife-like edge.

4. In a method of making a blown hollow plastic article in a molding apparatus comprising separate relatively movable blow-mold and blow-head elements by confining and inflating a portion of a plastic tube in the mold element with a waste portion of the tube projecting beyond the mold element to receive a portion of the head element inserted therein, the improvement of trimming the waste portion of the tube from the mold element-enclosed tube portion by the steps of initially substantially severing the tube waste portion from the remainder of the tube by relative longitudinal movement of said elements, fixing the tube waste portion to one of said elements for corotation, and relatively rotating said elements to complete the severance of said waste portion from said remainder of the tube.

References Cited in the file of this patent
UNITED STATES PATENTS

| | | |
|---|---|---|
| 2,378,586 | Schultz | June 19, 1945 |
| 2,810,934 | Bailey | Oct. 19, 1957 |

FOREIGN PATENTS

| | | |
|---|---|---|
| 692,500 | Great Britain | June 10, 1953 |